(12) United States Patent
Watanabe et al.

(10) Patent No.: US 8,010,268 B2
(45) Date of Patent: Aug. 30, 2011

(54) CONTROL APPARATUS FOR AUTOMATIC TRANSMISSION

(75) Inventors: Kazuyuki Watanabe, Anjo (JP); Hiromichi Kimura, Okazaki (JP); Koji Oshima, Nagoya (JP); Masaru Morise, Nukata-gun (JP); Hirofumi Onishi, Aichi-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 906 days.

(21) Appl. No.: 11/910,583

(22) PCT Filed: Apr. 13, 2006

(86) PCT No.: PCT/JP2006/308263
§ 371 (c)(1),
(2), (4) Date: Oct. 3, 2007

(87) PCT Pub. No.: WO2006/112494
PCT Pub. Date: Oct. 26, 2006

(65) Prior Publication Data
US 2008/0215218 A1    Sep. 4, 2008

(30) Foreign Application Priority Data
Apr. 14, 2005  (JP) ................................. 2005-116725

(51) Int. Cl.
*G06F 19/00* (2011.01)
*G06F 7/00* (2006.01)
*G06F 17/00* (2006.01)

(52) U.S. Cl. ................. 701/67; 701/51; 701/65; 477/93
(58) Field of Classification Search ................... 701/51, 701/62, 65, 67; 475/43, 67, 116, 119, 138, 475/139, 303; 192/3.51, 3.52, 3.57; 477/52, 477/62, 68, 70–75, 92–95, 114, 170–172, 477/176
See application file for complete search history.

(56) References Cited

U.S. PATENT DOCUMENTS

| | | | |
|---|---|---|---|
| 4,512,212 A * | 4/1985 | Ishikawa | 477/64 |
| 6,556,910 B2 * | 4/2003 | Suzuki et al. | 701/54 |
| 6,656,075 B2 * | 12/2003 | Park et al. | 475/128 |
| 2002/0086762 A1 * | 7/2002 | Park et al. | 475/144 |

FOREIGN PATENT DOCUMENTS

| | | |
|---|---|---|
| JP | 2 129454 | 5/1990 |
| JP | 2001 116125 | 4/2001 |
| JP | 2002 213588 | 7/2002 |
| JP | 2005 090645 | 4/2005 |

* cited by examiner

*Primary Examiner* — Jack Keith
*Assistant Examiner* — Rami Khatib
(74) *Attorney, Agent, or Firm* — Oblon, Spivak, McClelland, Maier & Neustadt, L.L.P.

(57) ABSTRACT

An ECU executes a program including causing a brake to enter an engaged state, when a first gear is implemented and when a difference between an output shaft rotation speed estimated from an input shaft rotation speed and a detected output shaft rotation speed is greater than a threshold value. When the brake enters the engaged state, the relative rotation between the inner race and the outer race of a one-way clutch is limited.

11 Claims, 4 Drawing Sheets

FIG. 3

|  | C1 | C2 | B1 | B2 | B3 | F |
|---|---|---|---|---|---|---|
| 1ST | ○ | × | × | ◎ | × | △ |
| 2ND | ○ | × | ○ | × | × | × |
| 3RD | ○ | × | × | × | ○ | × |
| 4TH | ○ | ○ | × | × | × | × |
| 5TH | × | ○ | × | × | ○ | × |
| 6TH | × | ○ | ○ | × | × | × |
| R | × | × | × | ○ | ○ | × |
| N | × | × | × | × | × | × |

○ ENGAGE
× DISENGAGE
◎ ENGAGE WHEN ENGINE BRAKE IS EFFECTED
△ ENGAGE ONLY WHEN DRIVING

CONTROL APPARATUS FOR AUTOMATIC TRANSMISSION

TECHNICAL FIELD

The present invention relates to a control apparatus for an automatic transmission, and particularly, to a control apparatus for an automatic transmission transmitting a driving force to wheels by a one-way clutch.

BACKGROUND ART

Conventionally, a one-way clutch is employed in an automatic transmission. Japanese Patent Laying-Open No. 2-129454 discloses a one-way clutch lubricating device that is capable of forcedly lubricating a one-way clutch. The one-way clutch lubricating device lubricates a one-way clutch in an automatic transmission, which includes a case support wall inwardly extending from an inner peripheral surface of a case, the one-way clutch arranged adjacent to the case support wall, and a cylindrical member fitted to both an inner peripheral surface of an inner race of the one-way clutch and the inner peripheral surface of the case support wall, for rotatably supporting on its inner peripheral side a rotary member. Splines are formed on an outer peripheral surface of the cylindrical member so that a first spline coupling portion is formed relative to the inner peripheral surface of the case support wall and a second spline coupling portion is formed relative to the inner peripheral surface of the inner race. A lubricant oil supply hole opening to the first spline coupling portion is formed on the case support wall. An oil hole opening to the second spline coupling portion penetrating the inner race in a radial direction is formed in the inner race. At each position outside the opening in the first spline coupling portion, outside the opening in the second spline coupling portion, and between the case support wall and the inner race side surface, a seal portion is provided. A lubricant oil path is formed from the lubricant oil supply hole via the first and second spline coupling portions, and the oil hole, to a slide portion of the one-way clutch.

According to the one-way clutch lubricating device disclosed in the publication, the lubricant oil from the lubricant oil supply hole is supplied via the first spline between the inner peripheral surface of the case support wall and the outer peripheral surface of the cylindrical member, the second spline between the inner surface of the inner race of the one-way clutch and the outer peripheral surface of the cylindrical member, and an oil hole penetrating the inner race in the radial direction, to the slide portion of the one-way clutch. That is, a lubricant oil path for lubricating the one-way clutch is formed by the lubricant oil supply hole, the first and second splines, and the oil hole. Here, the lubricant oil path is sealed by the seal portions, and therefore the lubricant oil would not leak somewhere in the lubricant oil path. Accordingly, the lubricant oil supplied from the lubricant oil supply hole is forcedly supplied to the slide portion of the one-way clutch, without depending on centrifugal force or the like. Thus, the one-way clutch is always surely lubricated by a sufficient amount of lubricant oil, and the durability and reliability of the one-way clutch can largely be improved.

Some one-way clutches employed in an automatic transmission are configured to limit rotation of the outer race and the inner race relative to each other (so that an engaged state is attained) when driving in first gear (when running by the driving force of the vehicle), and to permit the rotation (to attain a disengaged state) otherwise (when running not by the driving force of the vehicle, such as when coasting). This is to suppress deterioration of the drivability caused by an engine brake while driving in first gear. Meanwhile, when a vehicle runs on an undulating road, for example, as the vehicle vibrates upward and downward, the wheels may repeatedly leave and touch the road surface. In such a case, the one-way clutch repeatedly permits and limits rotation of the outer race and the inner race relative to each other. This may cause popping (i.e., a sprag, a locking element, a roller and the like constituting the one-way clutch greatly vibrate and move violently) and the one-way clutch may be damaged. The one-way clutch may also be damaged if it abruptly transits from the state where the rotation of outer race and the inner race relative to each other is permitted to the state where the rotation is limited. However, the one-way clutch lubricating device according to Japanese Patent Laying-Open No. 2-129454 is not directed to suppress the damage of the one-way clutch in such a situation.

DISCLOSURE OF THE INVENTION

An object of the present invention is to provide a control apparatus for an automatic transmission that can suppress damage of a one-way clutch.

A control apparatus for an automatic transmission according to the present invention controls an automatic transmission transmitting a driving force to a wheel by a limiting member that permits rotation of an outer race and an inner race relative to each other in one direction and that limits rotation of the outer race and the inner race in the other direction. The control apparatus includes: a suppressing portion coupled to the outer race and the inner race and suppressing a difference in rotation speed between the outer race and the inner race; a detecting portion detecting a state of the limiting member; and a control portion controlling the suppressing portion to suppress the difference in the rotation speed between the outer race and the inner race when a predetermined condition as to the state of the limiting member is satisfied.

According to the present invention, a driving force is transmitted by a limiting member (e.g., a one-way clutch). The state (e.g., the rotation state of an outer race and an inner race relative to each other) of the limiting member is detected. If the rotation of the outer race and the inner race relative to each other is repeatedly permitted and limited, popping may occur and the one-way clutch may be damaged. If the state where the rotation of the outer race and the inner race relative to each other is permitted abruptly transits to the state where the rotation is limited, the one-way clutch may be damaged. Accordingly, the suppressing portion is controlled to suppress the rotation of the outer race and the inner race relative to each other when such a condition is satisfied that enables determination of a state where the rotation of the outer race and the inner race relative to each other may repeatedly be permitted and limited and/or a state wherein a state where the rotation of the outer race and the inner race is permitted may abruptly transits to a state where the rotation is limited. This can suppress occurrence of popping and abrupt limitation of the rotation of the outer race and the inner race relative to each other. Thus, a control apparatus for an automatic transmission capable of suppressing damage of a one-way clutch can be provided.

Preferably, the outer race is fixed to a housing of the automatic transmission. The inner race is coupled to a rotation shaft of the automatic transmission. The suppressing portion is a frictional engagement element that is provided between the housing and the rotation shaft so as to couple to the limiting member via the housing and the rotation shaft, and that operates by a hydraulic pressure. The control portion controls the frictional engagement element so that the frictional engagement element enters an engaged state.

According to the present invention, the frictional engagement element is caused to enter an engaged state, when such a condition is satisfied that enables determination of a state where the rotation of the outer race and the inner race relative to each other may repeatedly be permitted and limited and/or a state wherein a state where the rotation of the outer race and the inner race is permitted may abruptly transits to a state where the rotation is limited. This can suppress occurrence of popping and abrupt limitation of the rotation of the outer race and the inner race relative to each other.

Further preferably, the state of the limiting member is a rotation state of the outer race and the inner race relative to each other.

According to the present invention, the rotation state of the outer race and the inner race relative to each other is detected. This provides exact understanding of the state of the limiting member.

Further preferably, the control apparatus further includes a rotation speed detecting portion detecting a rotation speed of an output shaft of the automatic transmission. The detecting portion detects the rotation state of the outer race and the inner race relative to each other based on a change rate of the rotation speed of the output shaft. The condition is a condition that the change rate of the rotation speed of the output shaft is greater than a predetermined change rate.

According to the present invention, the rotation speed of an output shaft of the automatic transmission is detected. If a change rate of the rotation speed of the output shaft is great, it can be regarded that the load applied via wheels to the automatic transmission is increased and decreased in short cycles because the wheels repeatedly leave or touch the road surface. In this case, the rotation of the outer race and the inner race relative to each other may repeatedly be permitted or limited. Therefore, when the condition that the change rate of the rotation speed of the output shaft is great is satisfied, the rotation of the outer race and the inner race relative to each other may be suppressed. This can suppress occurrence of popping.

Further preferably, the control apparatus further includes an estimating portion estimating a rotation speed of an output shaft of the automatic transmission), and a rotation speed detecting portion detecting a rotation speed of the output shaft of the automatic transmission. The detecting portion detects a rotation state of the outer race and the inner race relative to each other based on a difference between the estimated rotation speed and the detected rotation speed. The condition is a condition that the difference in the rotation speed is greater than a predetermined value.

According to the present invention, a rotation speed of an output shaft of the automatic transmission is estimated. For example, by dividing an input shaft rotation speed by the gear ratio, the rotation speed of the output shaft may be estimated. Further, a rotation speed of the output shaft is detected. If the difference between the estimated rotation speed and the detected rotation speed is great, it can be regarded that the rotation of the outer race and the inner race relative to each other is permitted. If thereafter the rotation of the outer race and the inner race relative to each other is again limited, then popping may occur in the limiting member. Therefore, when the condition that the difference in the rotation speed is greater than a predetermined value is satisfied, the rotation of the outer race and the inner race relative to each other may be suppressed. This can suppress occurrence of popping.

Further preferably, the control apparatus further includes a selecting portion selecting a control mode of the automatic transmission by an operation of a driver. The detecting portion detects the rotation state of the outer race and the inner race relative to each other an operation state of the selecting portion. The condition is a condition that the selecting portion is operated by the driver.

According to the present invention, a control mode of the automatic transmission (e.g., a shift range) is selected by the driver operating the selecting portion (e.g., a shift lever). When the shift lever is operated from "P position" to "D position", the driving force of a motive power source is transmitted to the wheels via the automatic transmission. Here, the input of the driving force of the motive power source into the automatic transmission may abruptly limit the rotation of the outer race and the inner race relative to each other. Therefore, when the condition that the selecting portion is operated by the driver is satisfied, the rotation of the outer race and the inner race relative to each other may be suppressed. This can suppress abrupt limiting of the rotation of the outer race and the inner race relative to each other.

Further preferably, the limiting member is a one-way clutch.

According to the present invention, damage of a one-way clutch in an automatic transmission transmitting a driving force to a wheel by the one-way clutch can be suppressed.

BRIEF DESCRIPTION OF THE DRAWINGS

FIG. 3 is an operation table representing correspondence between gears and clutches or brakes.

BEST MODES FOR CARRYING OUT THE INVENTION

Figure 1:
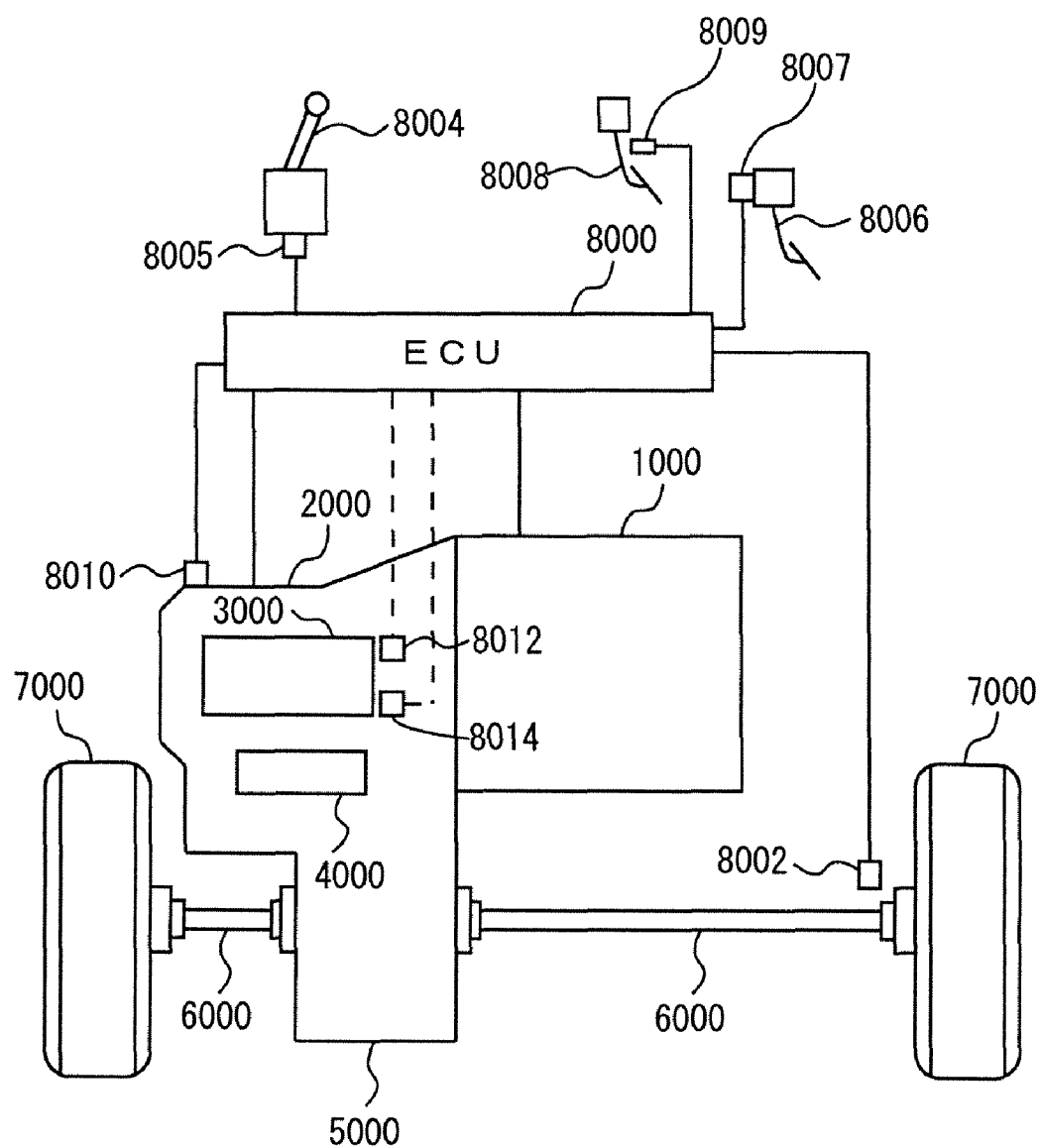
FIG. 1 is a control block diagram showing a vehicle incorporating a control apparatus according to an embodiment of the present invention.

In the following, referring to the drawings, an embodiment of the present invention will be described. In the following description, identical components are denoted by identical reference characters. Their labels and functions are also identical. Accordingly, detailed description thereof will not be repeated.

Referring to FIG. 1, a vehicle incorporating a hydraulic control apparatus for an automatic transmission according to a first embodiment of the present invention will be described. The vehicle is an FF (Front engine Front drive) vehicle. It is noted that a vehicle incorporating the control apparatus for an automatic transmission according to the present embodiment may be a vehicle other than FF.

The vehicle includes an engine 1000, a transmission 2000, a planetary gear unit 3000 constituting part of transmission 2000, a hydraulic circuit 4000 constituting part of transmission 2000, a differential gear 5000, a drive shaft 6000, a front wheel 7000, and an ECU (Electronic Control Unit) 8000.

Engine 1000 is an internal combustion engine that burns an air-fuel mixture of fuel injected from an injector (not shown) and air, inside a combustion chamber of a cylinder. A piston in the cylinder is pushed down by the combustion, and a crankshaft is rotated. An external combustion engine may be employed instead of an internal combustion engine. Further, a rotating electric machine or the like may be employed instead of engine 1000.

Transmission 2000 converts the rotation speed of the crankshaft to a desired rotation speed by implementing a desired gear. The output gear of transmission 2000 meshes with differential gear 5000. Planetary gear unit 3000 will be described in detail later.

A driveshaft 6000 is coupled to differential gear 5000 by spline-fitting or the like. Motive power is transmitted to the left and right front wheels 7000 via driveshaft 6000.

Connected to ECU 8000 via a harness or the like are a vehicle speed sensor 8002, a position switch 8005 of a shift lever 8004, an accelerator pedal position sensor 8007 of an accelerator pedal 8006, a stop lamp switch 8009 provided at a brake pedal 8008, an oil temperature sensor 8010, an input shaft rotation speed sensor 8012, and an output shaft rotation speed sensor 8014.

Vehicle speed sensor 8002 detects the vehicle speed from the rotation speed of drive shaft 6000, and transmits a signal representing the detected result to ECU 8000. The position of shift lever 8004 is detected by position switch 8005, and a signal representing the detected result is transmitted to ECU 8000. A gear of transmission 2000 is automatically implemented corresponding to the position of shift lever 8004. Additionally, the driver may operate to select a manual shift mode in which the driver can select a gear arbitrarily.

Accelerator pedal position sensor 8007 detects the position of accelerator pedal 8006, and transmits a signal representing the detected result to ECU 8000. Stop lamp switch 8009 detects the ON/OFF state of brake pedal 8008, and transmits a signal representing the detected result to ECU 8000. A stroke sensor detecting the stroke level of brake pedal 8008 may be provided instead of stop lamp switch 8009. Oil temperature sensor 8010 detects the temperature of the ATF (Automatic Transmission Fluid) of transmission 2000, and transmits a signal representing the detected result to ECU 8000.

Input shaft rotation speed sensor 8012 detects an input shaft rotation speed NIN of transmission 2000, and transmits a signal representing the detected result to ECU 8000. Output shaft rotation speed sensor 8014 detects an output shaft rotation speed NOUT of transmission 2000, and transmits a signal representing the detected result to ECU 8000.

ECU 8000 controls various devices such that the vehicle attains a desired traveling state based on signals transmitted from vehicle speed sensor 8002, position switch 8005, accelerator pedal position sensor 8007, stop lamp switch 8009, oil temperature sensor 8010, input shaft rotation speed sensor 8012, output shaft rotation speed sensor 8014, and the like, as well as map and program stored in a ROM (Read Only Memory).

Figure 2:
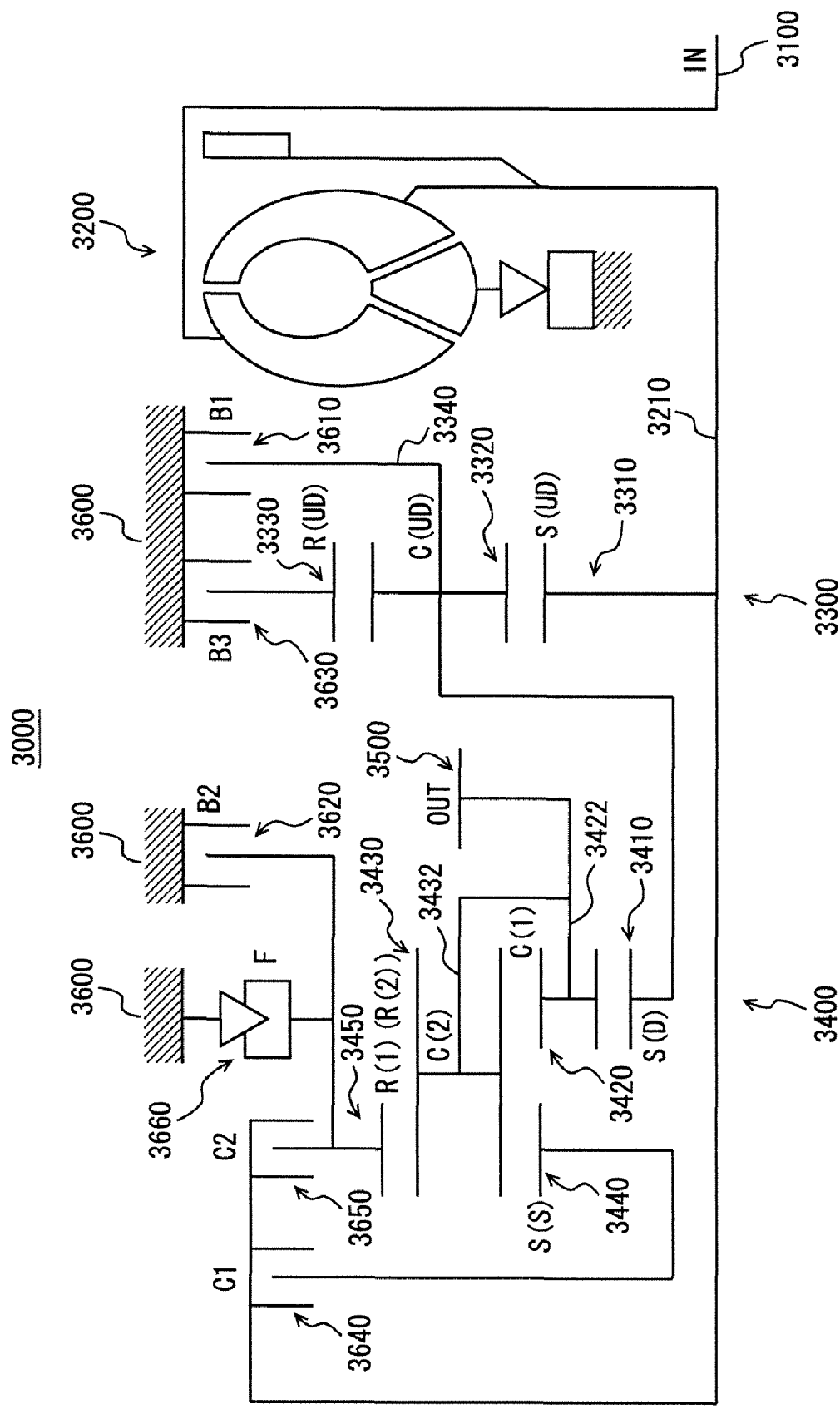
FIG. 2 is a skeleton diagram showing a planetary gear unit.

Referring to FIG. 2, planetary gear unit 3000 will be described. Planetary gear unit 3000 is connected to a torque converter 3200 having an input shaft 3100 coupled to the crankshaft. Planetary gear unit 3000 includes a first set of the planetary gear mechanism 3300, a second set of the planetary gear mechanism 3400, an output gear 3500, B1, B2, and B3 brakes 3610, 3620 and 3630 fixed to a gear case 3600, C1 and C2 clutches 3640 and 3650, and a one-way clutch F 3660.

First set 3300 is a single pinion type planetary gear mechanism. First set 3300 includes a sun gear S (UD) 3310, a pinion gear 3320, a ring gear R (UD) 3330, and a carrier C (UD) 3340.

Sun gear S (UD) 3310 is coupled to an output shaft 3210 of torque converter 3200. Pinion gear 3320 is rotatably supported on carrier C (UD) 3340. Pinion gear 3320 engages with sun gear S (UD) 3310 and ring gear R (UD) 3330.

Ring gear R (UD) 3330 is fixed to gear case 3600 by B3 brake 3630. Carrier C (UD) 3340 is fixed to gear case 3600 by B1 brake 3610.

Second set 3400 is a Ravigneaux type planetary gear mechanism. Second set 3400 includes a sun gear S (D) 3410, a short pinion gear 3420, a carrier C (1) 3422, a long pinion gear 3430, a carrier C (2) 3432, a sun gear S (S) 3440, and a ring gear R (1) (R (2)) 3450.

Sun gear S (D) 3410 is coupled to carrier C (UD) 3340. Short pinion gear 3420 is rotatably supported on carrier C (1) 3422. Short pinion gear 3420 engages with sun gear S (D) 3410 and long pinion gear 3430. Carrier C (1) 3422 is coupled with output gear 3500.

Long pinion gear 3430 is rotatably supported on carrier C (2) 3432. Long pinion gear 3430 engages with short pinion gear 3420, sun gear S (S) 3440, and ring gear R (1) (R (2)) 3450. Carrier C (2) 3432 is coupled with output gear 3500.

Sun gear S (S) 3440 is coupled to output shaft 3210 of torque converter 3200 by C1 clutch 3640. Ring gear R (1) (R (2)) 3450 is fixed to gear case 3600 by B2 brake 3620, and coupled to output shaft 3210 of torque converter 3200 by C2 clutch 3650. Ring gear R (1) (R (2)) 3450 is coupled to one-way clutch F 3660, and is disabled in rotation during a drive in first gear.

One-way clutch F 3660 is provided in parallel with B2 brake 3620. Specifically, one-way clutch F 3660 has the outer race fixed to gear case 3600, and has the inner race coupled to ring gear R (1) (R (2)) 3450 via the rotation shaft.

FIG. 3 is an operation table representing the relation between gears to be shifted and operation states of the clutches and brakes. By operating each brake and each clutch based on the combination shown in the operation table, the forward gears including first gear to sixth gear and the reverse gear are implemented.

Since one-way clutch F 3660 is provided in parallel with B2 brake 3620, it is not necessary to engage B2 brake 3620 in a driving state from the engine side (acceleration) during implementation of first gear (1ST). In the present embodiment, during the drive in first gear, one-way clutch F 3660 limits the rotation of ring gear R (1) (R (2)) 3450. When engine brake is effected, one-way clutch F 3660 does not limit the rotation of ring gear R (1) (R (2)) 3450.

Figure 4:
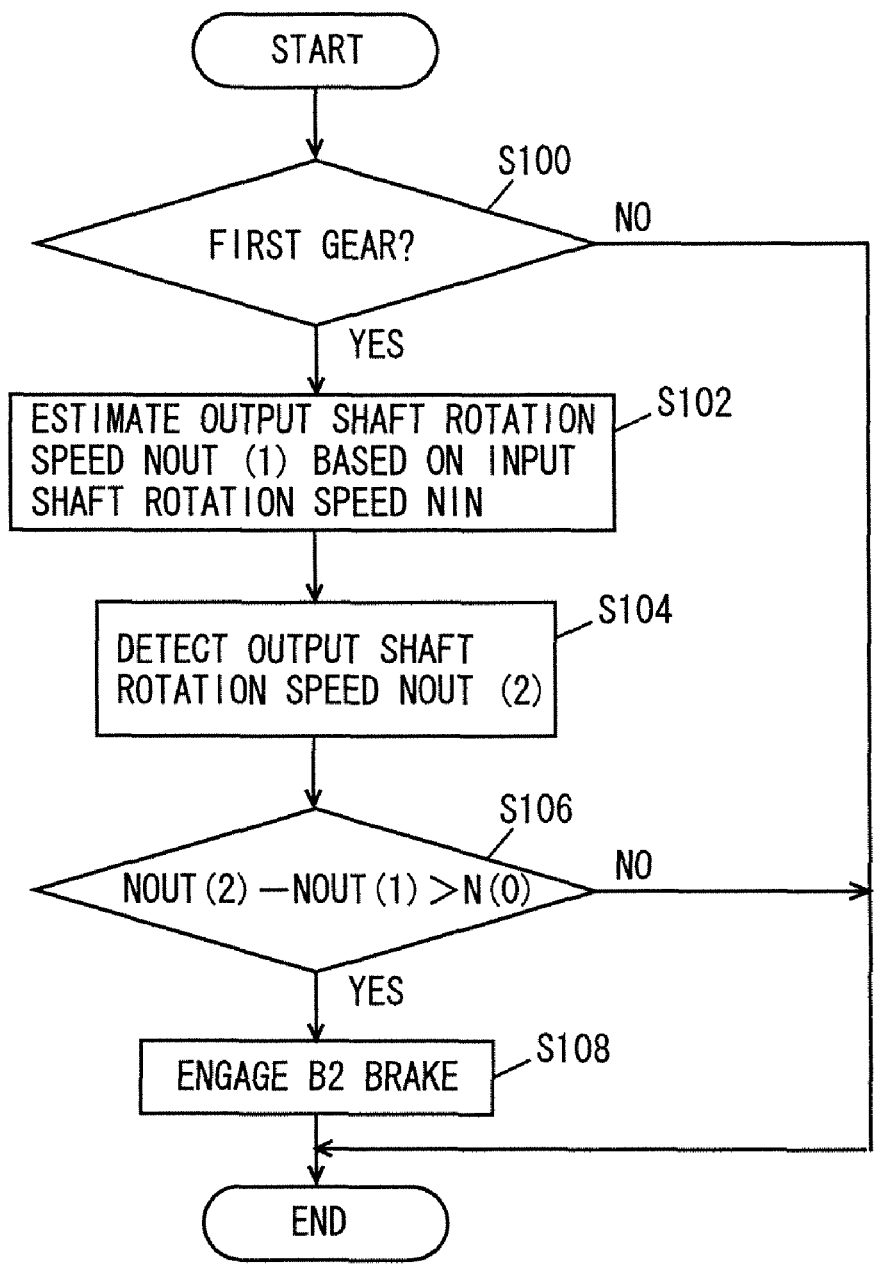
FIG. 4 is a flowchart showing a control structure of a program executed by the ECU in FIG. 1.

Referring to FIG. 4, a control structure of a program executed by ECU 8000 that is a control apparatus according to the present embodiment will be described.

In step (hereinafter step will be abbreviated as S) 100, ECU 8000 determines whether or not first gear is implemented. Since the gear is determined by ECU 8000 itself, whether or not first gear is implemented is determined inside ECU 8000. When first gear is implemented (YES in S100), the process goes to S102. Otherwise (NO in S100), the process ends.

In S102, ECU 8000 estimates an output shaft rotation speed NOUT (1) based on an input shaft rotation speed NIN that is detected from a signal transmitted from input shaft rotation speed sensor 8012. In S104, engine ECU 8000 detects an output shaft rotation speed NOUT (2) based on a signal transmitted from output shaft rotation speed sensor 8014.

In S106, ECU 8000 determines whether or not a difference between estimated output shaft rotation speed NOUT (1) and detected output shaft rotation speed NOUT (2) (output shaft rotation speed NOUT (2)—output shaft rotation speed NOUT (1)) is greater than a threshold value N (0). When the difference between estimated output shaft rotation speed NOUT (1) and detected output shaft rotation speed NOUT (2) is greater than threshold value N(0) (YES in S106), the process goes to S108. Otherwise (NO in S106), the process ends.

In S108, ECU 8000 causes B2 brake 3620 to enter an engaged state. Specifically, hydraulic circuit 4000 is controlled such that a hydraulic pressure is applied to a hydraulic servo of B2 brake 3620, and B2 brake 3620 is caused to enter an engaged state. Thereafter, this process ends.

A description will now be given of an operation of ECU 8000 that is the control apparatus according to the present embodiment based on the above-described structure and flowchart.

When first gear is implemented while the vehicle is running (YES in S100), output shaft rotation speed NOUT (1) is estimated based on input shaft rotation speed NIN that is detected from a signal transmitted from input shaft rotation speed sensor 8012 (S102). Output shaft rotation speed NOUT (2) is detected based on a signal transmitted from output shaft rotation speed sensor 8014 (S104).

For example, when the vehicle runs on an undulating road, front wheels 7000 (drive wheels) may repeatedly leave the road surface and thereafter touch the road surface again. If front wheels 7000 leave the road surface, the driving force transmitted from engine 1000 via transmission 2000 to front wheels 7000 is not transmitted to the road surface, and front wheels 7000 turn freely. Here, the inner race (ring gear R (1) (R (2)) 3450) of one-way clutch F3660 turns freely, whereby a difference in the rotation speed is generated between the outer race and the inner race. Thereafter when front wheels 7000 touch the road surface, the rotation of the inner race (ring gear R (1) (R (2)) 3450) of one-way clutch F3660 is again limited. When this situation repeatedly occurs, popping may occur in one-way clutch F3660.

In a state where popping may occur, that is, in a state where the inner race (ring gear R (1) (R (2)) 3450) of one-way clutch F3660 turns freely, actual output shaft rotation speed NOUT (2) becomes high. Accordingly, when the difference between estimated output shaft rotation speed NOUT (1) and actually detected output shaft rotation speed NOUT (2) is higher than threshold value N(0) (YES in S106), a hydraulic pressure is applied to a hydraulic servo of B2 brake 3620, and B2 brake 3620 is caused to enter an engaged state (S108).

Thus, the rotation of the rotation shaft coupled to ring gear R (1) (R (2)) 3450 is suppressed and the rotation of the inner race of one-way clutch F3660 is suppressed. Therefore, the difference in the rotation speed between the outer race and inner race of one-way clutch F3660 is suppressed. As a result, repetition of spinning of the inner race of one-way clutch F3660 and limiting of the rotation can be suppressed, and occurrence of popping can be suppressed.

As above, according to the ECU that is a control apparatus according to the present embodiment, in first gear where one-way clutch F limits the rotation of the inner race during a drive, if a difference between output shaft rotation speed NOUT (1) estimated based on input shaft rotation speed NIN and output shaft rotation speed NOUT (2) actually detected is greater than threshold value N(0), B2 brake is caused to be engaged. This can suppress generation of a difference in the rotation speed between the outer race and inner race of one-way clutch F. Therefore, occurrence of popping can be suppressed. As a result, damage of one-way clutch F can be suppressed and the durability can be improved. Also, even with one-way clutch F of low capacity, the required durability can be satisfied, and ultimately the fuel efficiency can be improved.

Though in the present embodiment the difference in the rotation speed between the inner race and outer race of one-way clutch F3660 is suppressed by causing B2 brake 3620 to engage, it is also possible to suppress the difference in the rotation speed between the inner race and the outer race by clutches, instead of brakes.

Further, instead of one-way clutch F3660 that may enter an engaged state (may limit the rotation of the inner race and the outer race) when first gear is implemented, the difference in the rotation speed between the inner race and outer race of a one-way clutch may be suppressed, which may enter an engaged state when other gear is implemented.

Still further, though it has been described that B2 brake 3620 is caused to engage when a difference between output shaft rotation speed NOUT (1) estimated from input shaft rotation speed NIN of transmission 2000 and output shaft rotation speed NOUT (2) is greater than threshold value N (0), B2 brake 3620 may be caused to engage when a number of times the difference exceeds threshold value N (0) is greater than a predetermined number of times.

Still further, B2 brake 3620 may be caused to engage when a change rate of output shaft rotation speed NOUT or a change rate of the rotation speed of wheels 7000 becomes greater than a predetermined change rate, or when it is increased and decreased for at least a predetermined number of times in a predetermined time period.

Still further, B2 brake 3620 may be caused to engage in a state where a driving force may abruptly be transmitted from engine 1000 to transmission 2000, such as when the driver changes shift lever 8004 from "P position".

Still further, B2 brake 3620 may be caused to engage when an upward and downward vibration (acceleration in the upward-downward direction) detected by a G sensor mounted on a vehicle is greater than a predetermined value, or when the frequency of the upward-downward vibration is higher than a predetermined value.

Still further, B2 brake 3620 may be caused to engage based on road surface information obtained from a navigation apparatus or the like.

Still further, a location or a road where B2 brake 3620 was caused to enter an engaged state when first gear was implemented may be stored so that B2 brake 3620 may be caused to enter an engaged state when running through the same location or road.

It should be understood that the embodiment disclosed herein is illustrative and non-restrictive in every respect. The scope of the present invention is defined by the terms of the claims, rather than the description above, and is intended to include any changes within the meaning and scope equivalent to the terms of the claims.

The invention claimed is:

1. A control apparatus for an automatic transmission transmitting a driving force to a wheel by a limiting member that permits rotation of an outer race and an inner race relative to each other in one direction and that limits rotation of said outer race and said inner race relative to each other in the other direction, comprising:
   a suppressing portion coupled to said outer race and said inner race and suppressing a difference in rotation speed between said outer race and said inner race;
   a detecting portion detecting a state of said limiting member; and
   a control portion controlling said suppressing portion to suppress the difference in the rotation speed between said outer race and said inner race when a predetermined condition as to the state of said limiting member is satisfied, wherein
   said outer race is fixed to a housing of said automatic transmission,
   said inner race is coupled to a rotation shaft of said automatic transmission,
   said suppressing portion is a frictional engagement element that is provided between said housing and said rotation shaft so as to couple to said limiting member via said housing and said rotation shaft, and that operates by a hydraulic pressure, said control portion controls said frictional engagement element so that said frictional engagement element enters an engaged state, and said predetermined condition is the limiting member turning freely and is based on a difference between a detected rotation speed of an output shaft of said automatic transmission and an estimated rotation speed of said output shaft of said automatic transmission.

2. The control apparatus for the automatic transmission according to claim 1, wherein said limiting member is a one-way clutch.

3. The control apparatus for the automatic transmission according to claim 1, wherein said predetermined condition is satisfied when the difference between said detected rotation speed of said output shaft of said automatic transmission and said estimated rotation speed of said output shaft of said automatic transmission is greater than a threshold value.

4. The control apparatus for the automatic transmission according to claim 1, wherein said control portion controls said frictional engagement element so that said frictional engagement element enters the engaged state only when first gear is implemented by said automatic transmission.

5. A control apparatus for an automatic transmission transmitting a driving force to a wheel by a limiting member that permits rotation of an outer race and an inner race relative to each other in one direction and that limits rotation of said outer race and said inner race relative to each other in the other direction, comprising:

suppressing means coupled to said outer race and said inner race and suppressing a difference in rotation speed between said outer race and said inner race;

detecting means for detecting a state of said limiting member; and control means for controlling said suppressing means to suppress the difference in the rotation speed between said outer race and said inner race when a predetermined condition as to the state of said limiting member is satisfied, wherein said outer race is fixed to a housing of said automatic transmission, said inner race is coupled to a rotation shaft of said automatic transmission, said suppressing means is a frictional engagement element that is provided between said housing and said rotation shaft so as to couple to said limiting member via said housing and said rotation shaft, and that operates by a hydraulic pressure, said control means includes means for controlling said frictional engagement element so that said frictional engagement element enters an engaged state, and said predetermined condition is the limiting member turning freely and is based on a difference between a detected rotation speed of an output shaft of said automatic transmission and an estimated rotation speed of said output shaft of said automatic transmission.

6. The control apparatus for the automatic transmission according to claim 5, wherein said limiting member is a one-way clutch.

7. The control apparatus for the automatic transmission according to claim 5, wherein said predetermined condition is satisfied when the difference between said detected rotation speed of said output shaft of said automatic transmission and said estimated rotation speed of said output shaft of said automatic transmission is greater than a threshold value.

8. The control apparatus for the automatic transmission according to claim 5, wherein said control means controls said frictional engagement element so that said frictional engagement element enters the engaged state only when first gear is implemented by said automatic transmission.

9. A control apparatus for an automatic transmission transmitting a driving force to a wheel by a one-way clutch that permits rotation of an outer race and an inner race relative to each other in one direction and that limits rotation of said outer race and said inner race relative to each other in the other direction, comprising:

a brake coupled to said outer race and said inner race and suppressing a difference in rotation speed between said outer race and said inner race; and an ECU detecting a state of said one-way clutch and controlling said brake to suppress the difference in the rotation speed between said outer race and said inner race when a predetermined condition as to the state of said one-way clutch is satisfied, wherein said outer race is fixed to a gear case of said automatic transmission, said inner race is coupled to a rotation shaft of said automatic transmission, said brake is provided between said gear case and said rotation shaft so as to couple to said one-way clutch via said gear case and said rotation shaft, and operates by a hydraulic pressure, and said predetermined condition is the one way clutch turning freely and is based on a difference between a detected rotation speed of an output shaft of said automatic transmission and an estimated rotation speed of said output shaft of said automatic transmission.

10. The control apparatus for the automatic transmission according to claim 9, wherein said predetermined condition is satisfied when the difference between said detected rotation speed of said output shaft of said automatic transmission and said estimated rotation speed of said output shaft of said automatic transmission is greater than a threshold value.

11. The control apparatus for the automatic transmission according to claim 9, wherein said ECU controls said brake so that said brake enters the engaged state only when first gear is implemented by said automatic transmission.

* * * * *